(12) United States Patent
Ikebe et al.

(10) Patent No.: US 6,205,115 B1
(45) Date of Patent: Mar. 20, 2001

(54) DISC CARTRIDGE

(75) Inventors: Masaru Ikebe; Masatoshi Okamura; Kenji Hashizume, all of Nagano (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 09/150,257

(22) Filed: Sep. 9, 1998

(30) Foreign Application Priority Data

Sep. 10, 1997 (JP) .................................................... 9-261105
Sep. 11, 1997 (JP) .................................................... 9-262907
Feb. 10, 1998 (JP) .................................................. 10-042978

(51) Int. Cl.[7] .................................................. G11B 23/03
(52) U.S. Cl. ............................................................ 369/291
(58) Field of Search .................................. 369/289, 291; 360/133, 77.2; 206/307, 308.1, 308.3, 312, 313

(56) References Cited

U.S. PATENT DOCUMENTS 5,579,129 * 11/1996 Childers .............................. 360/133
5,991,260 * 11/1999 Kano et al. .......................... 369/291

FOREIGN PATENT DOCUMENTS

| 43 40 761 | 6/1994 | (DE) . |
|---|---|---|
| 0 335 461 | 10/1989 | (EP) . |
| 0308 012 A1 * | 12/1989 | (EP) . |
| 0 358 269 | 3/1990 | (EP) . |
| 0 546 736 | 6/1993 | (EP) . |
| 0 744 743 | 11/1996 | (EP) . |
| 0 838 819 | 4/1998 | (EP) . |
| 0 843 310 | 5/1998 | (EP) . |
| 2 272 990 | 6/1994 | (GB) . |
| 2 273 601 | 6/1994 | (GB) . |
| 63-87677 | 4/1988 | (JP) . |
| 63-266669 | 11/1988 | (JP) . |
| 6-131844 * | 5/1994 | (JP) . |
| 7-320359 * | 12/1995 | (JP) . |
| 10-144031 * | 5/1998 | (JP) . |
| 10-144032 * | 5/1998 | (JP) . |

* cited by examiner

Primary Examiner—David L. Ometz
Assistant Examiner—Tianjie Chen
(74) Attorney, Agent, or Firm—Lerner, David, Littenberg, Krumholz & Mentlik, LLP

(57) ABSTRACT

A disc cartridge capable of effectively preventing inadvertent falling out or detachment of a disc from a casing during handling thereof, to thereby ensure safety of the disc cartridge. A cover includes a disc receiving section and is slidably arranged between an upper casing member and a lower casing member, to thereby be outwardly drawn out through a disc takeout opening for taking out the disc from a casing. This permits the disc to be readily taken out from the casing by merely drawing out the cover from the casing.

20 Claims, 12 Drawing Sheets

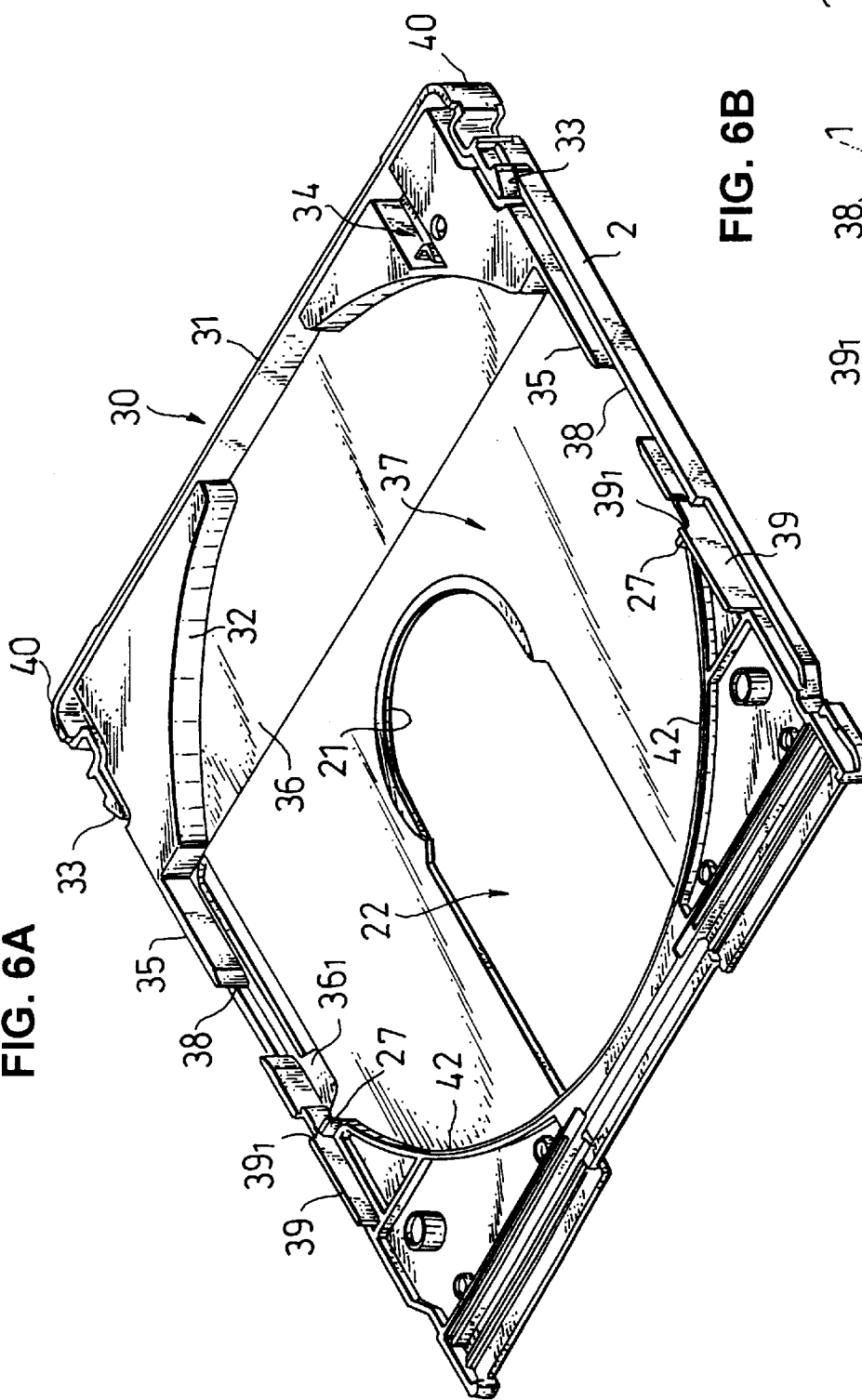
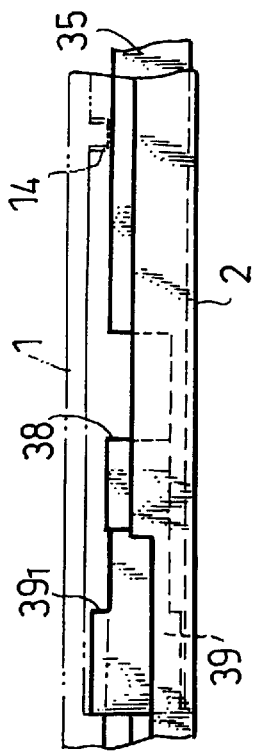
FIG. 6A
FIG. 6B

FIG. 9A
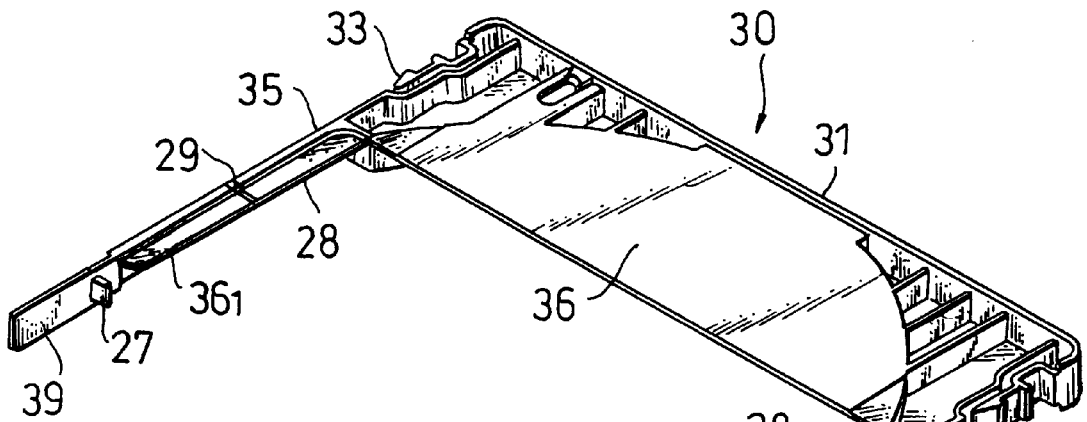
FIG. 9B
FIG. 9C
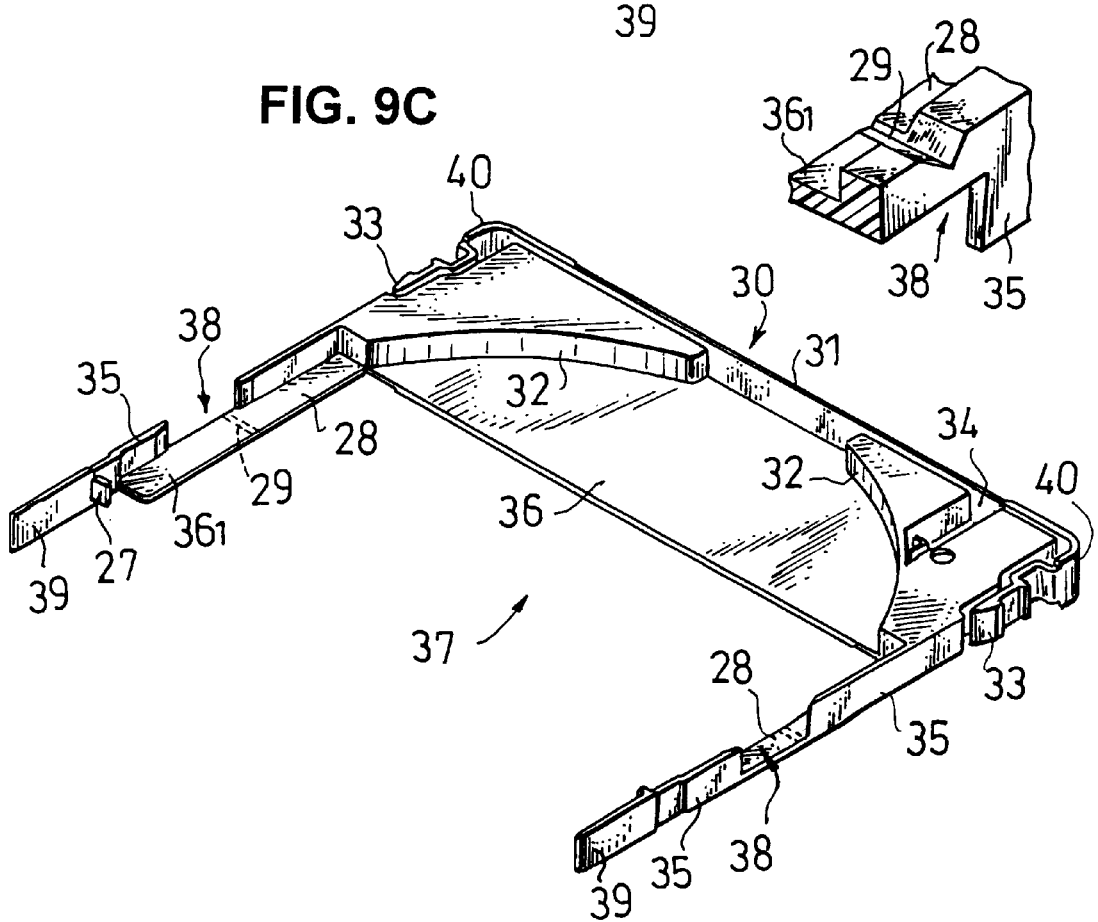

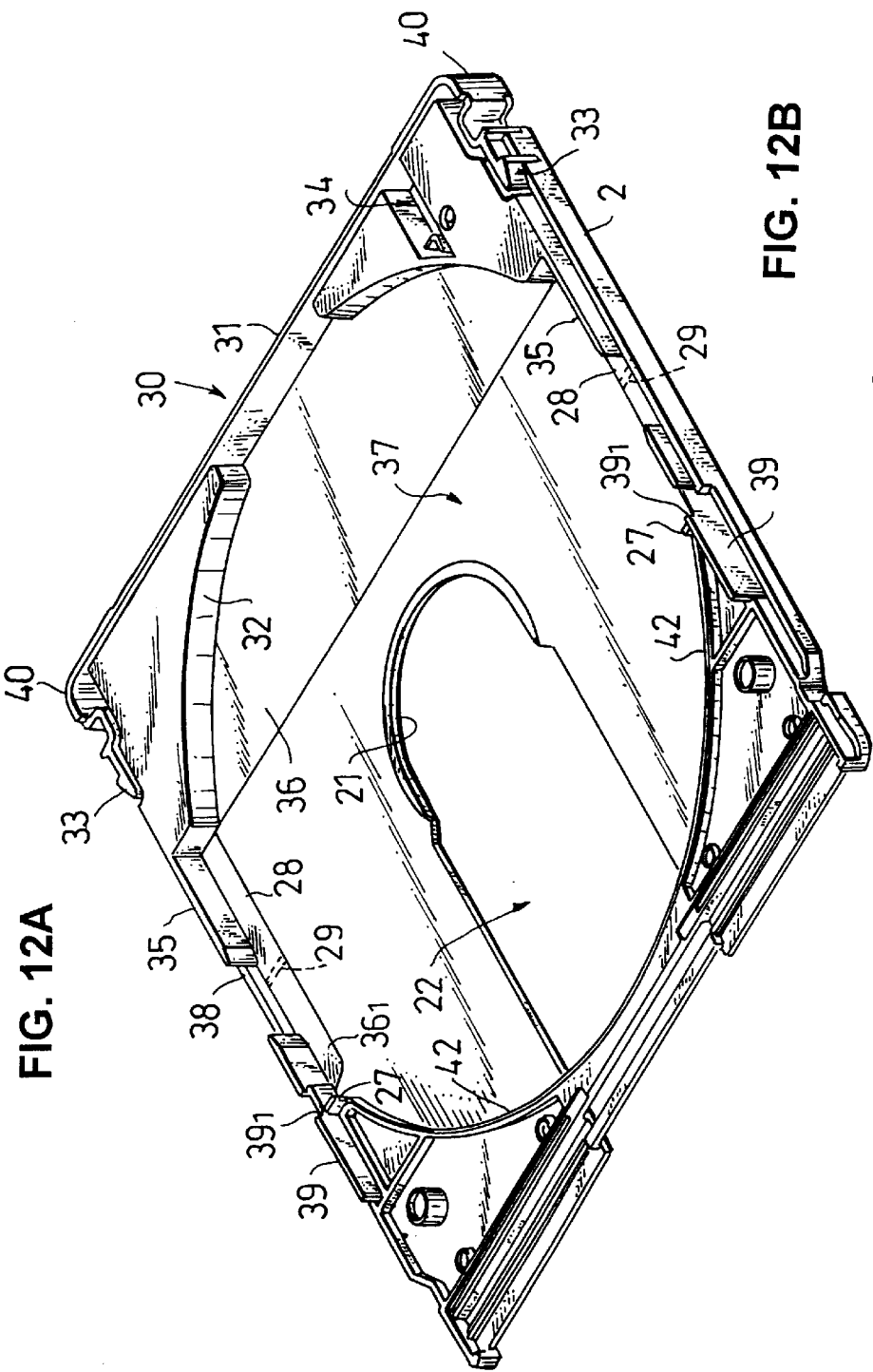
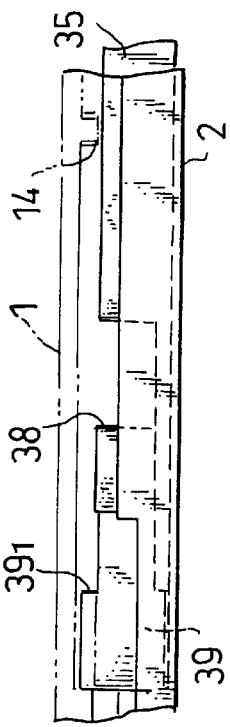
FIG. 12A
FIG. 12B

DISC CARTRIDGE

BACKGROUND OF THE INVENTION

This invention relates to a disc cartridge, and more particularly to a disc cartridge having a disc-shaped medium such as an optical disc, a magneto-optical disc or the like received in a casing in a manner to be rotatable therein and removable therefrom for replacement.

In general, an information medium including, for example, a disc-shaped medium such as a magnetic disc, an optical disc, a magneto-optical disc or the like is used in the form of a disc cartridge while being received in a casing formed by joining upper and lower casing members to each other. The disc cartridge includes a shutter for selectively closing openings such as head insertion holes, drive shaft insertion holes and the like formed through the upper and lower casing members of the casing. In general, such a conventional disc cartridge is not provided with any means for taking out the disc-shaped medium from the casing for replacement. However, a disc cartridge called a CD caddie which is used for a CD-ROM or the like is constructed so as to permit a CD to be drawn out of a casing. Such a CD caddie is adapted to be used in a CD-ROM reproducing unit of the type of using the CD caddie. Thus, the disc-shaped medium is used either in the form as taken out from the disc cartridge or in the form as received in the disc cartridge depending on the type of a recording/reproducing unit, so that it is needed to take out the disc-shaped medium from the disc cartridge as required.

However, the conventional disc cartridge equipped with the disc-shaped medium takeout mechanism is not constructed so as to permit a shutter mechanism to be arranged on a side of the disc cartridge on which a disc-shaped medium takeout cover is arranged. Thus, the disc-shaped medium takeout mechanism fails to be applied to a disc cartridge of the type that openings such as head insertion holes, drive shaft insertion holes and the like are formed through an upper casing member and/or a lower casing member. (See Japanese Patent Application Laid-Open Publication No. 266669/1988.)

Another disc-shaped medium takeout mechanism is also proposed which is constructed so as to open only a side surface of the casing opposite to the shutter to take out the disc-shaped medium from the disc cartridge. The proposed disc-shaped medium takeout mechanism causes a disc-shaped medium takeout cover to be operated either detachably or pivotally. Detachable operation of the disc-shaped medium takeout cover leads to separation or removal of the cover from the casing, resulting in the cover being possibly lost. Pivotal operation of the cover causes it to be engaged with the casing through only pivot shafts, so that the cover, casing or pivot shafts may be broken due to application of shock or external force to the disc cartridge. Also, it fails to fully close the cover due to inclination thereof with respect to the casing, leading to a deterioration in reliability. (See Japanese Patent Application Laid-Open Publication No. 87677/1988.)

Further, the conventional disc cartridge of the type that the disc-shaped medium is taken out from the casing for replacement is constructed so as to take out the disc-shaped medium from the casing by gravity while keeping a disc-shaped medium takeout port of the casing downwardly directed or oriented. Thus, the disc cartridge encounters a common problem that careless or inadvertent disc taking-out operation by a user often causes accidental falling out or detachment of the disc from the casing.

SUMMARY OF THE INVENTION

The present invention has been made in view of the foregoing disadvantages of the prior art.

Accordingly, it is an object of the present invention to provide a disc cartridge which includes a shutter arranged on a casing so as to selectively close openings such as drive shaft insertion holes, head insertion holes and the like and which is constructed into such a structure that both upper and lower sides of the disc cartridge are formed to have substantially the same configuration, resulting in ensuring double-sided operation thereof while facilitating takeout and insertion of a disc-shaped medium with respect to the disc cartridge for replacement of the disc-shaped medium.

It is another object of the present invention to provide a disc cartridge which is capable of effectively preventing inadvertent falling out or detachment of a disc-shaped medium from a casing during handling thereof, to thereby ensure safety of the disc cartridge.

In accordance with the present invention, a disc cartridge is provided. The disc cartridge includes a casing constituted of an upper casing member and a lower casing member and a disc-shaped medium rotatably received in the casing. The casing is formed with openings including drive shaft insertion holes and head insertion holes. The disc cartridge also includes a shutter arranged on the casing so as to selectively close the openings and an elastic member arranged on the casing so as to urge the shutter in a direction in which the shutter is closed, wherein the casing is formed with a disc takeout opening through which the disc-shaped medium is taken out from the casing. The disc cartridge further includes a cover arranged in the casing so as to open and close the disc takeout opening. The disc cartridge thus generally constructed is featured in that the cover includes a disc receiving section and is slidably arranged between the upper casing member and the lower casing member, to thereby be drawn out through the disc takeout opening from the casing, resulting in the disc-shaped medium being taken out from the casing. Thus, when the cover is slidably moved in a direction opposite to the shutter, the disc receiving section of the cover in which the disc-shaped medium is received is drawn outwardly from the casing for loading or unloading the disc-shaped medium with respect to the casing, to thereby facilitate replacement of the disc-shaped medium. Further, the shutter is constantly urged in a direction of closing thereof by means of the elastic member, resulting in smooth and safe movement of the shutter being ensured.

In a preferred embodiment of the present invention, the cover is slidably drawn out from the casing in a direction opposite to the shutter by a distance equal to or more than a radius of the disc-shaped medium.

In a preferred embodiment of the present invention, the cover is provided with a bendable section so that it may be bent about the bendable section in relation to a direction in which the cover is slidably drawn out. The cover may be bent through the bendable section in the course of being drawn out from the casing, to thereby ensure smooth loading and unloading of the disc-shaped medium with respect to the casing, resulting in replacement of the disc-shaped medium being highly facilitated.

In a preferred embodiment of the present invention, the casing includes opposite side walls which form a part of a side wall of the cartridge. The cover includes an outer wall portion which constitutes a part of the side wall of the cartridge for closing the disc takeout opening, a pair of side wall portions provided on opposite ends of the outer wall portion in a manner to extend therefrom, and a disc support section arranged so as to support a lower surface of the disc-shaped medium while being defined between the outer wall portion and side wall portions. The outer wall portion, side wall portions and disc support section cooperate with each other to provide the disc receiving section and the cover is slidably fitted in the casing while permitting the side wall portions to be slidable along the opposite side walls of the casing. Such construction ensures safe loading and unloading of the disc-shaped medium with respect to the casing by operation of the cover while preventing the disc-shaped medium from being inadvertently detached from the casing.

In a preferred embodiment of the present invention, the cover includes a stopper mechanism constituted by elastic elements adapted to be engaged with the casing. The elastic elements are engaged with respective recesses formed in the casing, to thereby prevent the cover from being advertently open.

In a preferred embodiment of the present invention, the disc receiving section is further constituted of arcuate ribs provided in the casing and disc positioning ribs of an arcuate shape provided in the cover so as to face the outer periphery of the disc-shaped medium, wherein the arcuate ribs of the casing and the disc positioning ribs of the cover are arranged in a manner to be opposite to each other. The arcuate ribs of the casing and the disc positioning ribs of the cover cooperate with each other to define a circle. Such construction facilitates loading and unloading of the disc-shaped medium with respect to the casing and prevents opening of the disc takeout opening for drawing-out of the cover from the casing from leading to inadvertent detachment of the disc-shaped medium from the casing.

In a preferred embodiment of the present invention, the side wall portions of the cover are each provided thereon with a disc holding portion. The disc holding portions are opposite to each other, wherein the disc holding portions are positioned forwardly of a straight line defined so as to extend in parallel with the outer wall portion of the cover and through a center of the disc-shaped medium received in the disc receiving section and arranged so as to hold the lower surface of the disc-shaped medium.

In a preferred embodiment of the present invention, the cover further includes receiving ribs through which the disc support section is connected to the disc holding portions and which extend along the side wall portions, respectively.

In a preferred embodiment of the present invention, the cover is provided with a disc takeout mechanism for moving the disc-shaped medium upon movement of the cover in the direction toward an open position. Arrangement of the disc takeout mechanism on the cover facilitates operation of taking out the disc-shaped medium from the casing and inserting the disc-shaped medium into the casing while ensuring safety in the operation, because it eliminates a necessity of taking out the disc-shaped medium by gravity while downwardly orientating the disc takeout opening and prevents the disc-shaped medium from being detached from the casing by inadvertent disc takeout operation.

In a preferred embodiment of the present invention, the present invention may be realized in the form of a disc cartridge wherein an optical disc is received in the casing and the shutter of a substantially U-shape in section is fitted on the casing in a manner to be movable in both lateral directions.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 2A and 2B each show a cover incorporated in the disc cartridge of FIG. 1, wherein FIG. 2A is an enlarged perspective view of the cover, which is viewed from a lower side of a casing and FIG. 2B is an enlarged perspective view of the cover, which is viewed from an upper side of the casing;

FIGS. 4A and 4B each show an erasure prevention member incorporated in the disc cartridge of FIG. 1, wherein FIG. 4A is an enlarged perspective view of the erasure prevention member, which is viewed from the lower side of the casing and FIG. 4B is an enlarged perspective view of the erasure prevention member, which is viewed from the upper side of the casing;

FIGS. 5A and 5B each show the cover kept incorporated in a lower casing member of the disc cartridge of FIG. 1, wherein FIG. 5A is a perspective view of the cover drawn out of the lower casing member for charging of a disc therein and FIG. 5B is a perspective view of the cover upon completion of charging of the disc therein;

FIGS. 6A and 6B each show the cover incorporated in the lower casing member of the disc cartridge of FIG. 1, wherein FIG. 6A is a perspective view of the cover prior to charging of a disc therein and FIG. 6B is a fragmentary enlarged side elevation view of the cover;

FIGS. 9A, 9B and 9C each show a cover incorporated in the disc cartridge of FIG. 8, wherein FIG. 9A is an enlarged perspective view of the cover, which is viewed from a lower side of a casing, FIG. 9B is an enlarged perspective view of an essential part of the cover and FIG. 9C is an enlarged perspective view of the cover, which is viewed from an upper side of the casing;

FIGS. 10A and 10B each show the cover incorporated in a lower casing member of the disc cartridge of FIG. 8, wherein FIG. 10A is a perspective view of the cover drawn out of the lower casing member and FIG. 10B is a perspective view of the cover bent during charging of a disc therein;

FIGS. 12A and 12B each show the cover incorporated in the lower casing member of the disc cartridge of FIG. 8, wherein FIG. 12A is a perspective view of the cover kept inserted into the lower casing member prior to charging of a disc therein and FIG. 12B is a fragmentary enlarged side elevation view of the cover.

DETAILED DESCRIPTION OF THE PREFERRED EMBODIMENTS

Figure 1:
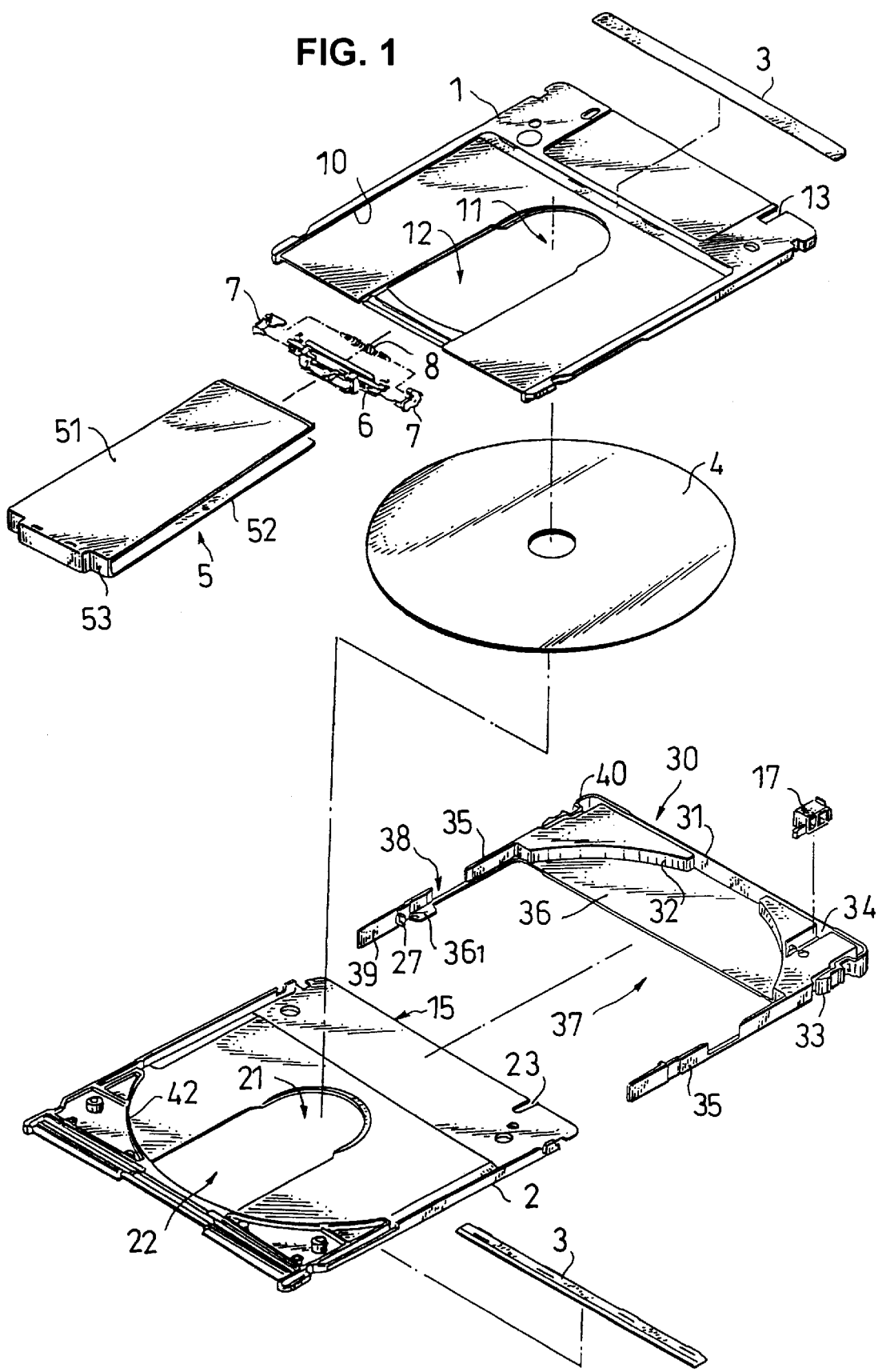
FIG. 1 is an exploded perspective view showing an embodiment of a disc cartridge according to the present invention.

Now, a disc cartridge according to the present invention will be described hereinafter with reference to the accompanying drawings.

Referring first to FIGS. 1 to 7, an embodiment of a disc cartridge according to the present invention is illustrated. A disc cartridge of the illustrated embodiment is adapted to receive an optical disc received therein. The disc cartridge includes a casing constituted of an upper casing member 1 and a lower casing member 2. The disc cartridge also includes a disc-shaped medium (hereinafter referred to as "disc") 4 rotatably received in the casing so as to act as an information medium. The disc 4 may be either a both-sided recordable/reproducible disc or a one-sided recordable/reproducible disc. The upper and lower casing members 1 and 2 are formed with openings or holes such as head insertion holes 12 and 22 through which a head of a recording/reproducing unit is inserted into the disc cartridge, drive shaft insertion holes 11 and 21 through which a drive shaft of the unit is inserted thereinto, and the like, respectively. The disc cartridge further includes a shutter 5 for selectively closing such holes, which shutter is slidably arranged on a shutter slide area 10 provided on an outer surface of the casing in a manner to be depressed or recessed from a level of the outer surface. The shutter 5 includes an upper plate 51, a lower plate 52 and a connection plate 53 through which the upper plate 51 and lower plate 52 are connected to each other and is formed to have a substantially U-shape in section. The shutter 5 has a slider including a first slider member 6 and second slider members 7 for slidably guiding the shutter 5 and a spring 8 acting as an elastic member for constantly urging the shutter 5 in a direction of closing the holes incorporated therein. The slider is provided with hook-like projections, which are operatively engaged with grooves provided on an inner surface of the casing to move the shutter 5 between a closed position and an open position.

The disc cartridge of the illustrated embodiment also includes a pair of guide elements 3 each arranged for guiding a distal end of a corresponding one of the upper plate 51 and lower plate 52 of the shutter 5 from an outside of the distal end. The guide elements 3 are each fixed onto a surface of a corresponding one of the upper and lower casing members 1 and 2 by fusion or adhesion, to thereby ensure smooth sliding of the shutter 5 and prevent the distal end of each plate being raised.

The casing is formed on a side surface portion thereof opposite to a side surface portion thereof on which the shutter 5 is arranged with a disc takeout opening 15 which permits the disc 4 to be taken out from the casing therethrough. Also, the casing is provided thereon with a disc takeout opening cover 30 for selectively opening the disc takeout opening 15. For this purpose, at least one of the upper and lower casing members 1 and 2 is provided on opposite sides thereof with guide grooves 24 for guiding side wall portions 35 of the disc takeout opening cover 30, so that the cover 30 is fitted in the casing in a manner to be slidable along the guide grooves 24. This results in the cover 30 being open while being drawn out from the casing. In the illustrated embodiment, the guide grooves 24 are provided on the lower casing member 2, therefore, the cover 30 is fitted in the lower casing member 2. Thus, the disc takeout opening cover 30 is slidably drawn out from the casing in a direction opposite to the shutter 5. Also, the disc takeout opening cover 30 is so constructed that a distance by which it is drawn out from the casing is set to be equal to or more than a radius of the disc 4 and that the disc 4 is prevented from inadvertently falling out from the casing.

Figure 2A:
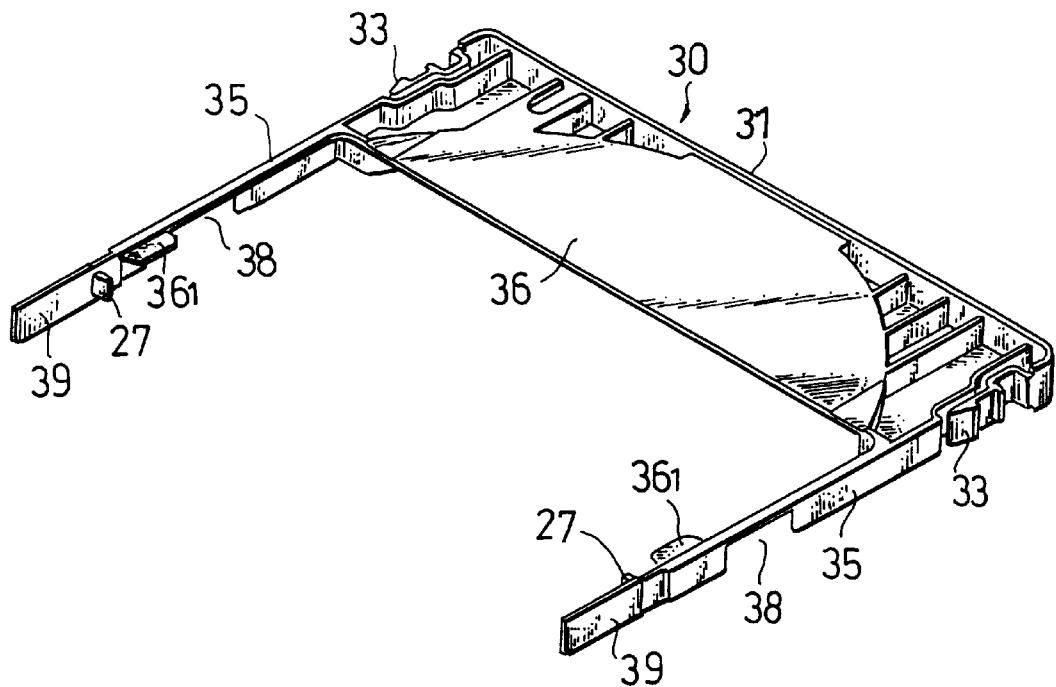
Figure 2B:
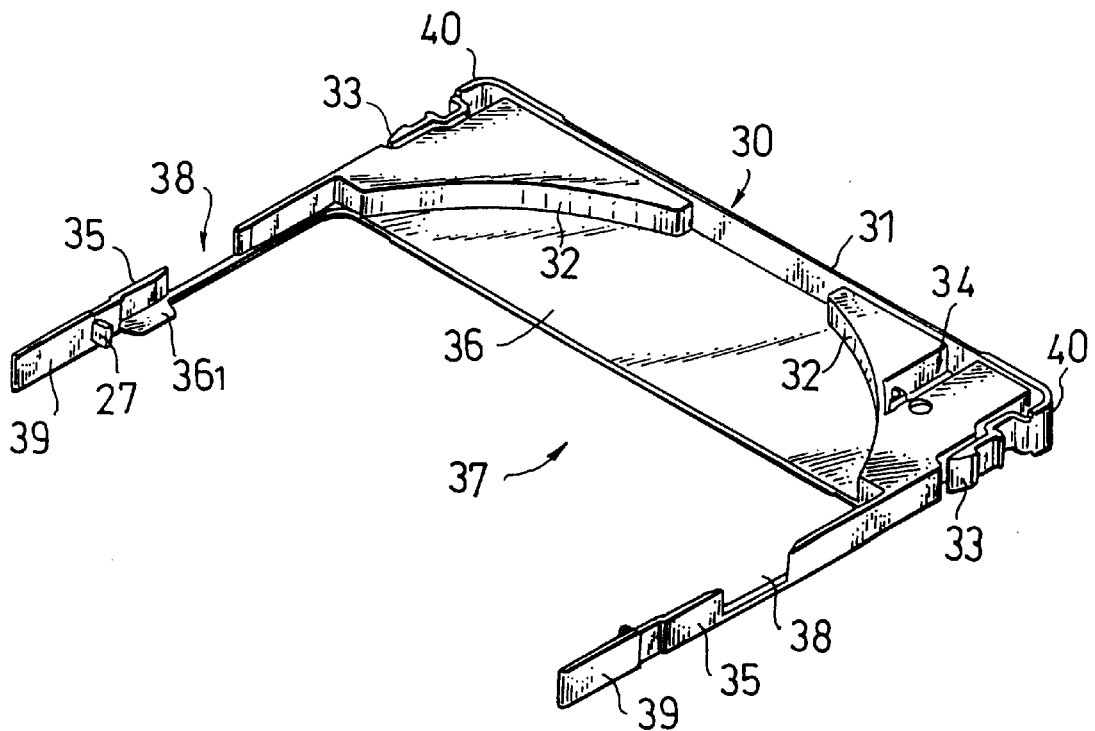
Figure 3:
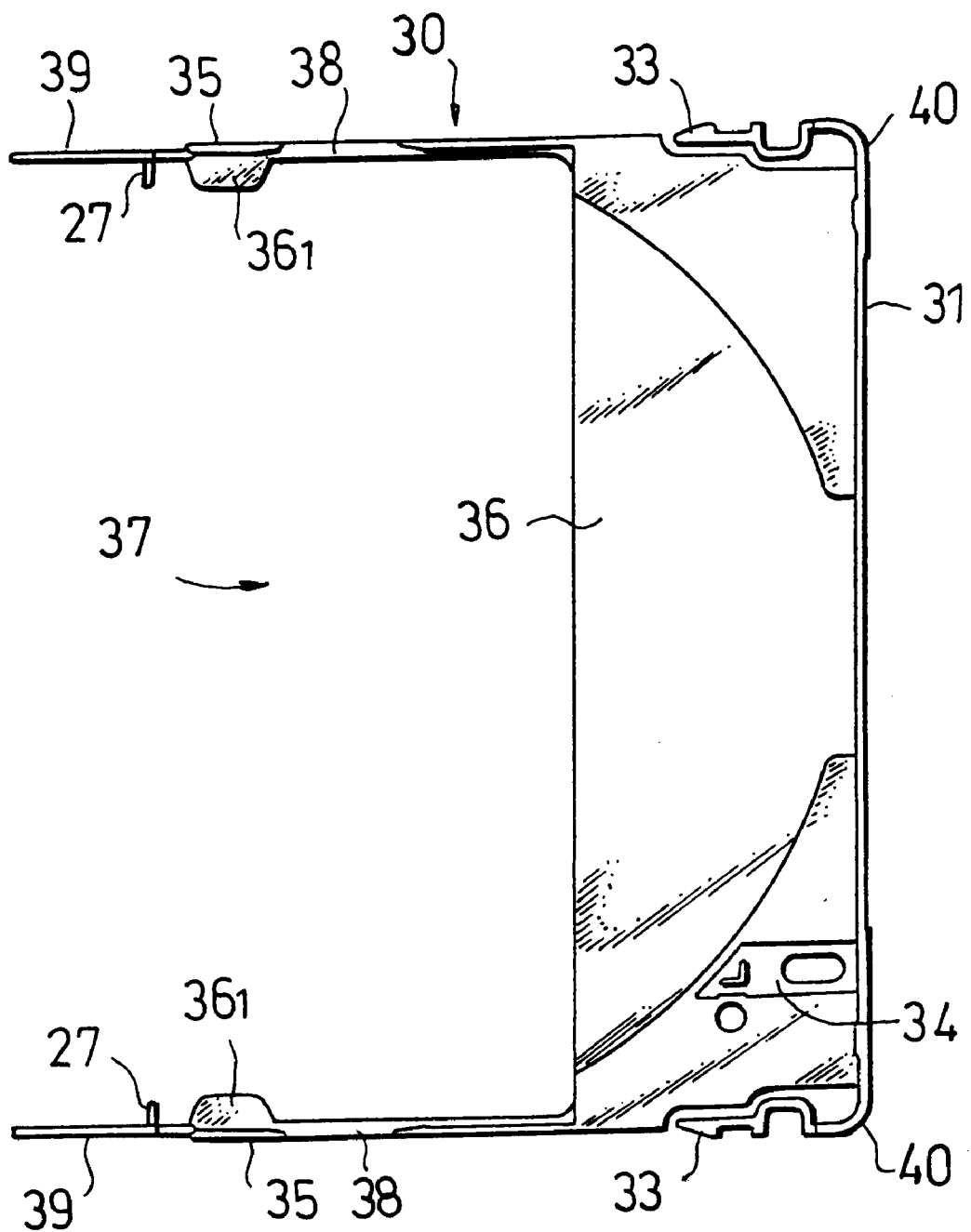
FIG. 3 is a plan view of the cover shown in FIGS. 2A and 2B.

Also, the cover 30, as shown in FIGS. 2A to 3, includes an outer wall portion 31 acting as a drawer front, as well as constituting a part of a side wall of the cartridge which closes the disc takeout opening 15 when the cover 30 is fully inserted or drawn into the casing. The cover 30 also includes a pair of disc positioning ribs 32 of an arcuate shape arranged inside the outer wall portion 31, as well as a pair of the above-described side wall portions 35 provided on opposite ends of the outer wall portion 31 in a manner to extend therefrom while being opposite to each other. Also, the cover 30 includes a disc support section 36 arranged so as to support a lower surface of the disc 4 thereon while being surrounded or defined by the outer wall portion 31 and side wall portions 35. In the illustrated embodiment, the outer wall portion 31, disc positioning ribs 32, side wall portions 35 and disc support section 36 thus arranged cooperate with each other to provide a disc receiving section 37. Further, the cover 30 is provided with an erasure prevention section 34 for fittedly holding an erasure prevention member 17 therein in a manner to be in proximity to the outer wall portion 31. The cover 30 is fitted in the lower casing member 2 while sliding the side wall portions 35 of the cover 30 along the opposite side walls of the lower casing member 2 which constitute a part of the side wall of the cartridge.

The disc support section 36 is constituted by a bottom wall of the cover 30. Thus, the bottom wall 36 of the cover 30 functions to support the lower surface of the disc 4 thereon during taking-out of the disc 4 from the casing and inserting thereof into the casing. Also, the side wall portions 35 of the cover 30 are provided thereon with disc holding portions $36_1$ which are opposite to each other. The disc holding portions $36_1$ are engaged or associated with the lower surface of the disc 4, to thereby effectively prevent the disc 4 from being inadvertently detached from the cover 30.

The cover 30 is also provided with a disc takeout mechanism 27 for moving the disc 4 along with the cover 30 when the cover 30 is moved in the direction toward the open position for drawing-out of the cover 30 from the disc takeout opening 15, so that drawing-out of the cover 30 from the casing may permit the disc 4 to be taken out from the casing.

The disc takeout mechanism 27 is constituted by projections each provided on a distal portion of an inner surface of a corresponding one of the side wall portions 35 of the cover 30 in a manner to be inwardly projected therefrom and be abutted against an outer periphery of the disc 4 received in the cover 30 to move the disc 4 along with the cover 30 upon drawing-out of the cover 30 from the casing. The projections may be arranged so as to be spaced in the direction toward the shutter 5 from the outer periphery of the disc 4 when the cover 30 keeps the disc takeout opening 15 closed and so as to be abutted against the outer periphery of the disc 4 to move the disc 4 toward the disc takeout opening 15 during movement of the cover 30 in the direction toward the open position.

Figure 5A:
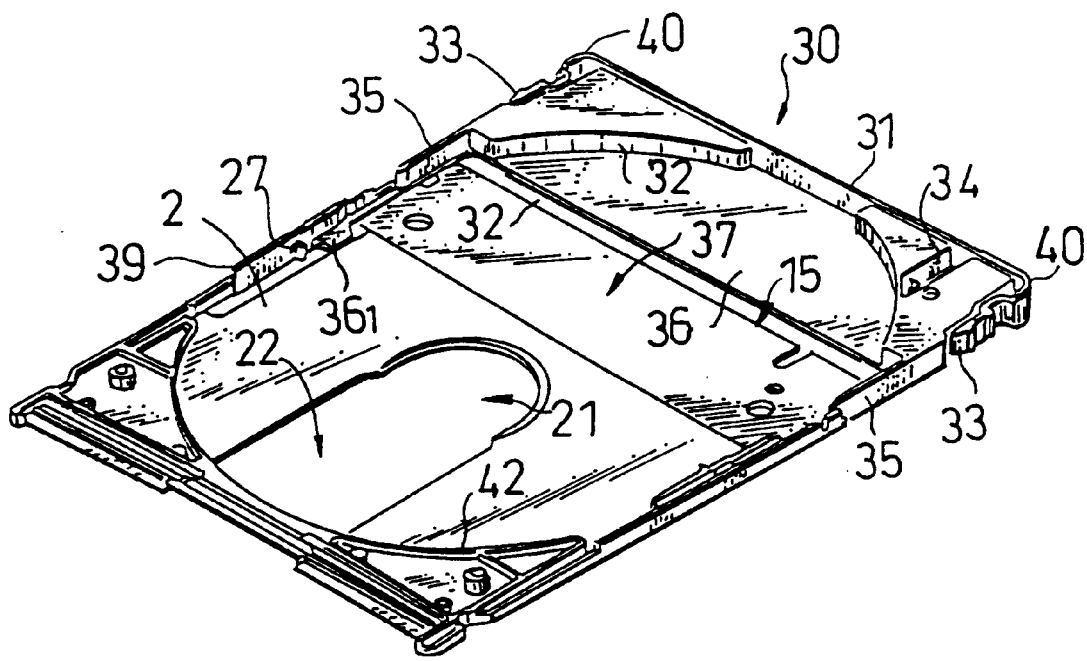
Figure 5B:
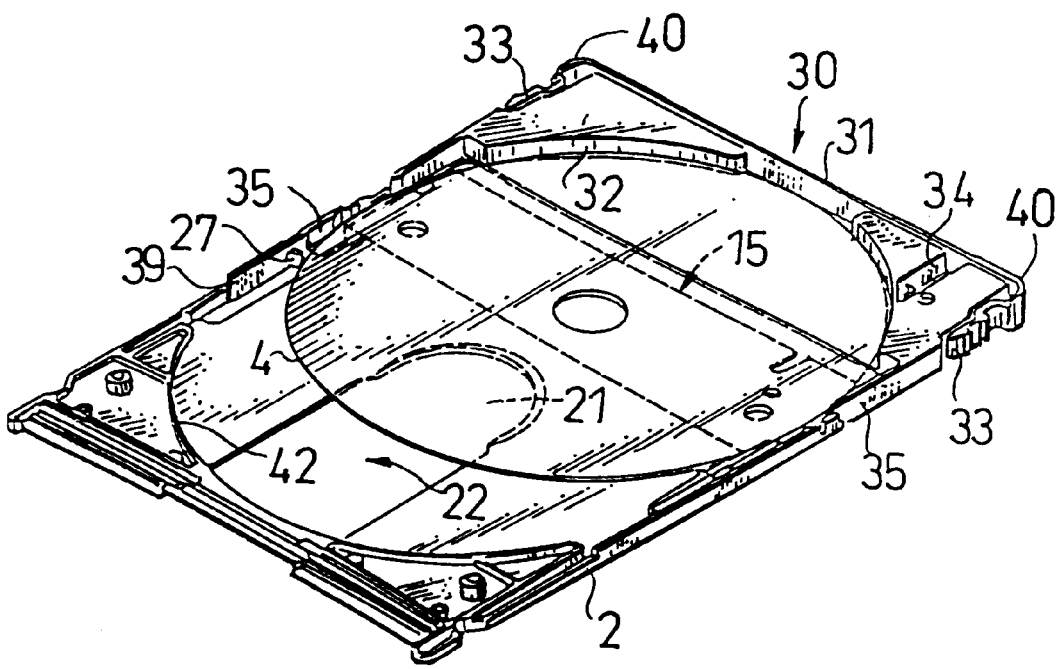
Figure 7:
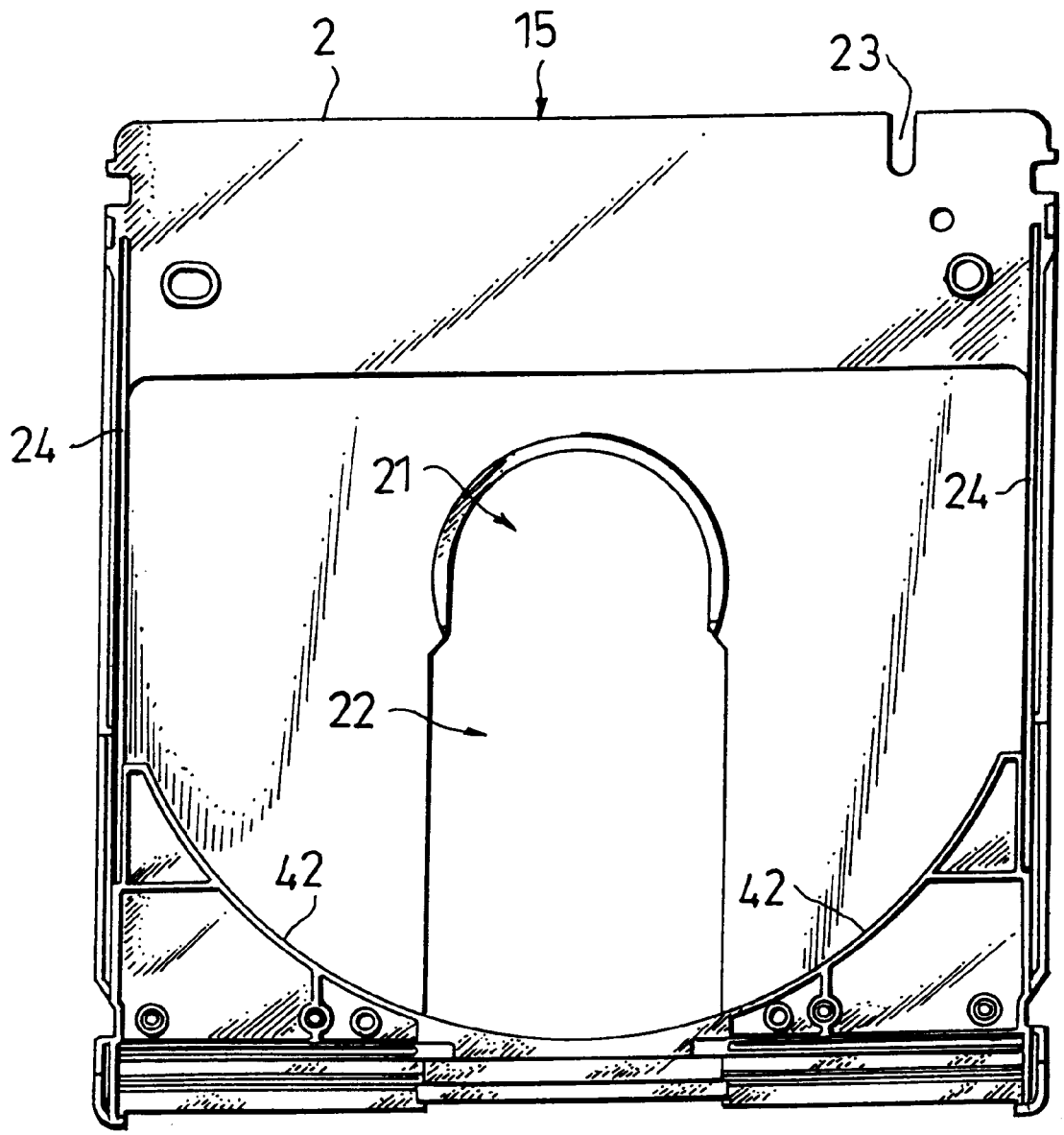
FIG. 7 is a plan view showing the lower casing member incorporated in the disc cartridge of FIG. 1.
Figure 8:
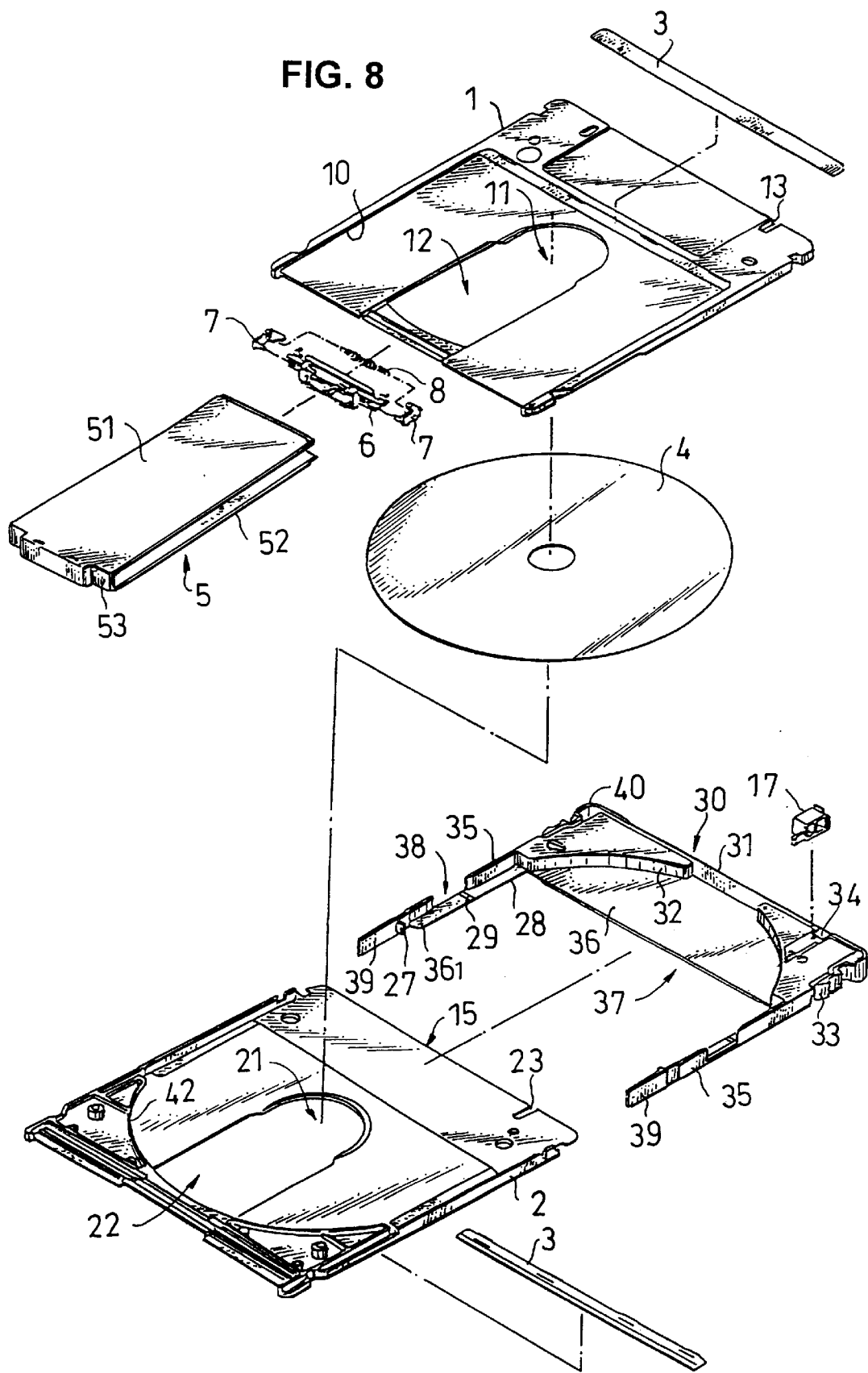
FIG. 8 is an exploded perspective view showing a second embodiment of a disc cartridge according to the present invention.
Figure 10A:
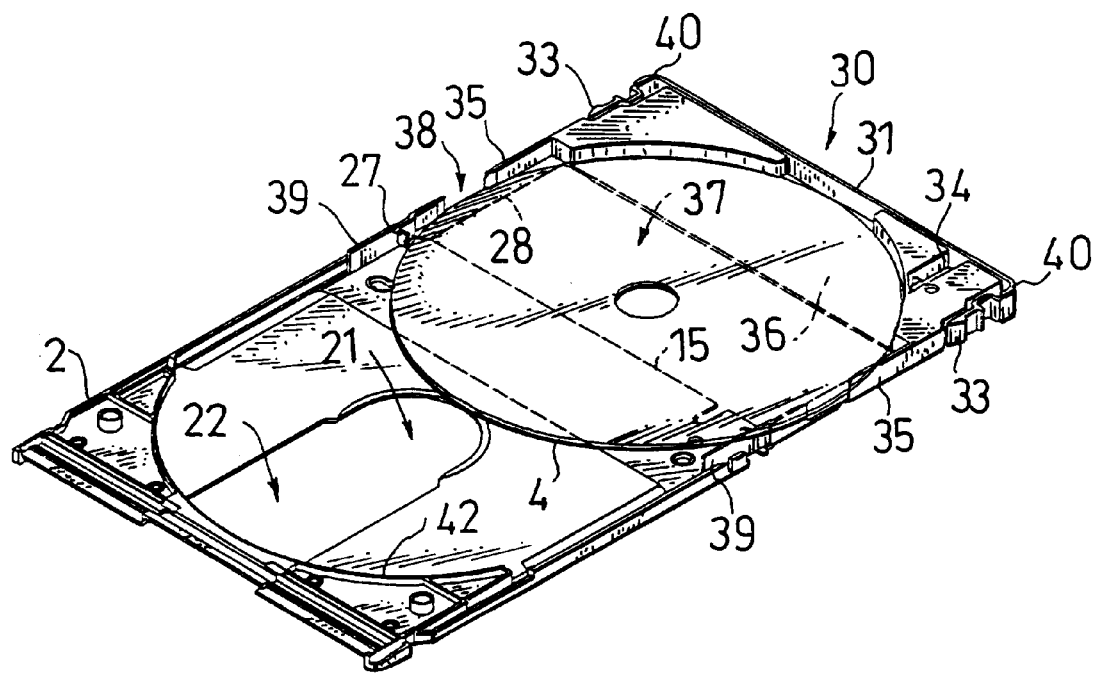
Figure 10B:
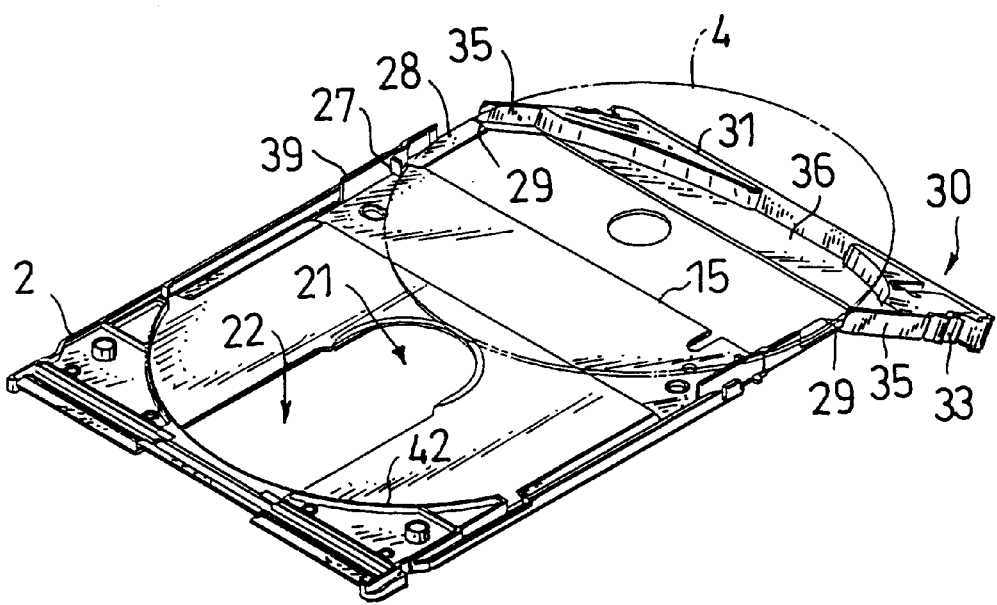
Figure 11:
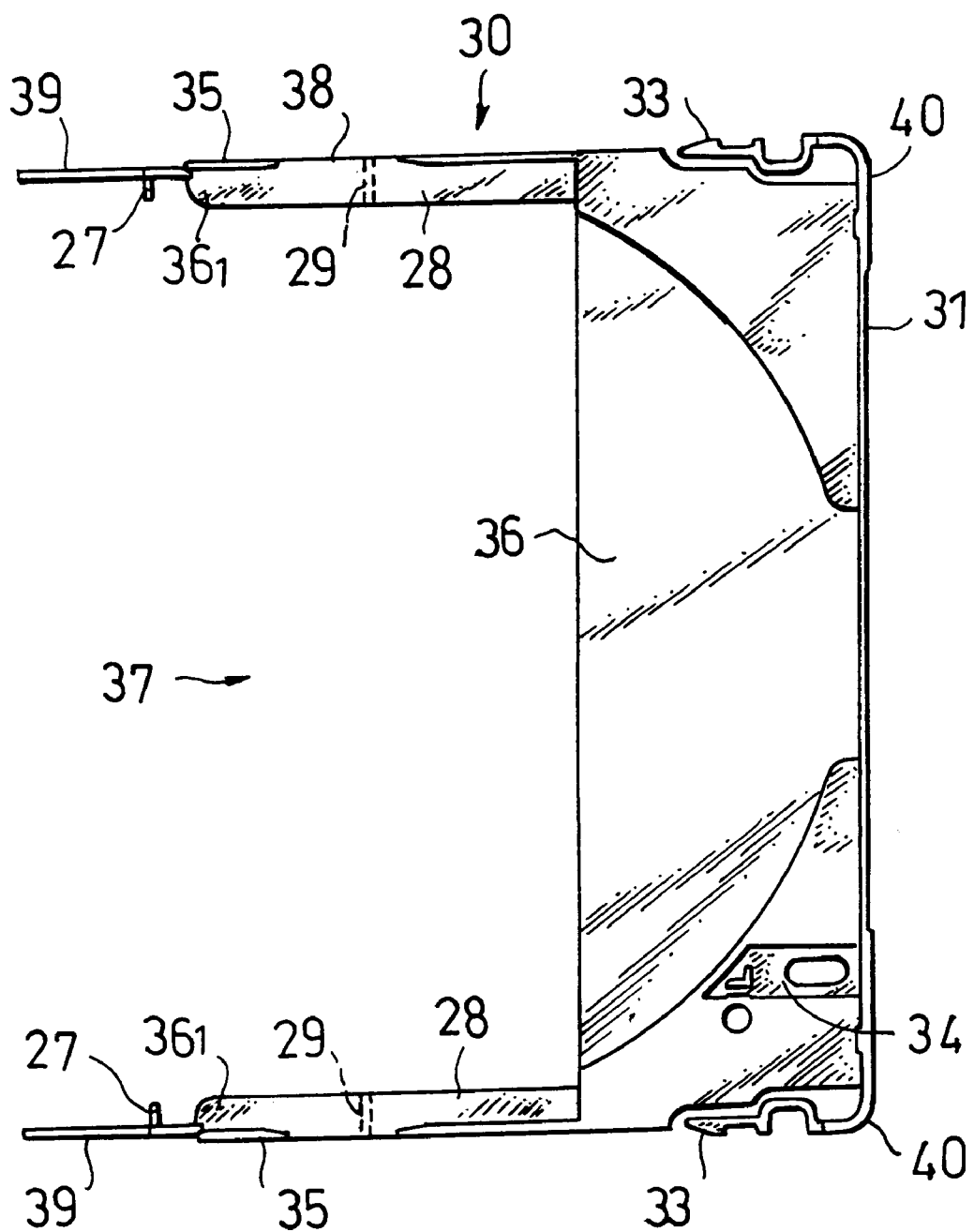
FIG. 11 is a plan view showing the cover incorporated in the disc cartridge of FIG. 8.

In this instance, as shown in FIG. 6A, the disc moving projections 27 are arranged so as to be positioned at a location spaced toward the shutter 5 from the disc receiving section 37, to thereby be outside a disc receiving area, resulting in ensuring smooth rotation of the disc 4, when the cover 30 keeps the disc takeout opening 15 closed as shown in FIG. 5A. Also, the projections 27 are arranged so as to be positioned in the disc receiving area, to thereby be abutted against the outer periphery of the disc 4, resulting in moving the disc 4 toward the disc takeout opening 15 upon movement of the cover 30, when the cover 30 is moved in the direction toward the open position, as shown in FIG. 5B.

Thus, taking-out of the disc 4 from the casing is attained by merely opening the cover 30 without inclining the casing.

In the illustrated embodiment, the cover 30 is constructed into a drawer-type structure. Alternatively, the cover 30 may be constructed into a rotator-type structure when the disc cartridge may be provided with a member which acts in the direction of taking-out of the disc in conformity to movement of the cover.

Also, the cover 30 includes a stopper mechanism constituted by elastic elements 33 adapted to be engaged with respective recesses formed in the casing, which elements are provided on the side wall portions 35 of the cover 30, respectively. Further, the cover 30, as described above, is provided on the inner surface of the side wall portions 35 thereof with the disc holding portions $36_1$ in a manner to be opposite to each other. The disc holding portions $36_1$ are positioned outside a straight line defined so as to extend in parallel with the outer wall portion 31 of the cover 30 which closes the disc takeout opening 15 and through a center of the disc 4 placed in the disc receiving section 37 and are arranged so as to hold the lower surface of the disc 4, with the center of the disc 4 being interposed between the disc holding portions $36_1$, to thereby prevent the disc 4 from being dislocated from the disc receiving section 37. When it is required to take out the disc 4 from the casing, the disc 4 may be taken out from the casing by merely opening the cover 30 even when the casing is kept inclined.

The disc holding portions $36_1$ are so arranged that when the cover 30 is kept closed, they are positioned on opposite sides of the disc 4 with the center of the disc 4 being interposed therebetween. Such arrangement of the disc holding portions $36_1$ ensures that the disc 4 is stably received in the casing. Also, it permits the disc 4 to be held on the disc holding portions $36_1$, to thereby facilitate takeout of the disc 4 from the casing, when the cover 30 is moved in the direction toward the open position.

The casing in which the cover 30 is fitted is provided therein with arcuate ribs 42, which are so arranged that they cooperate with the disc positioning ribs 32 of an arcuate shape provided in the cover 30 so as to face the outer periphery of the disc 4 to define a circle, resulting in the disc receiving section 37 described above being further complemented. This permits the disc 4 to be stably received in the casing.

The cover 30 is preferably made of a resin material such as polyacetal resin or the like which exhibits increased sliding characteristics. The upper and lower casing members 1 and 2 are generally made of a resin material such as ABS resin or the like. In this regard, the upper and lower casing members 1 and 2 are preferably made of a resin material different from that of the cover 30; because when the cover 30 is made of the same material as the casing members, joining between the upper casing member 1 and the lower casing member 2 by ultrasonic fusion bonding causes the cover 30 to be concurrently fixedly joined to the upper and lower casing members 1 and 2 by vibration.

Both side wall portions 35 of the cover 30 are constructed so as to be slid on the inner surface of each of the upper and lower casing members 1 and 2. The side wall portions 35, as shown in FIG. 1, may each be partly cut away to form a cutout 38, to thereby provide a space area for the disc receiving section 37.

The upper casing member 1 and lower casing member 2 are respectively formed with cutouts 13 and 23 in which the erasure prevention member 17 is fitted, so that the erasure prevention member 17 may be slidably held in the erasure prevention section 34 of the cover 30, to thereby render the disc 4 to be selectively recordable or unrecordable.

Figure 4A:
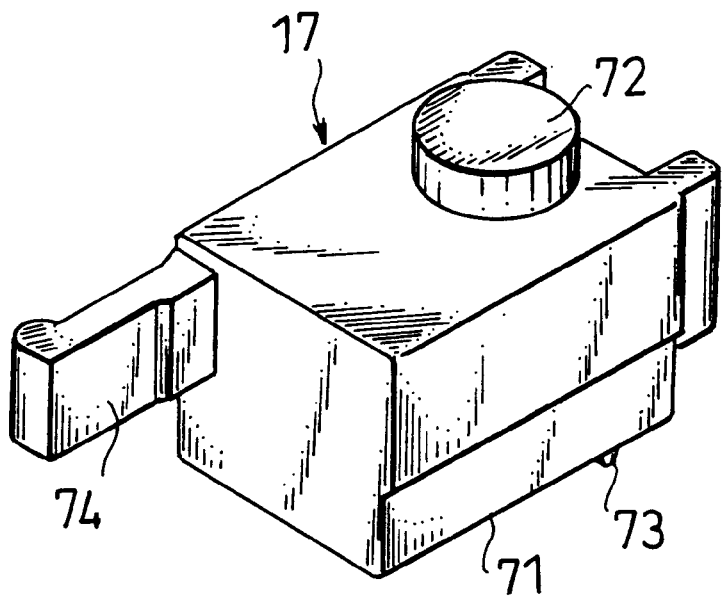
Figure 4B:
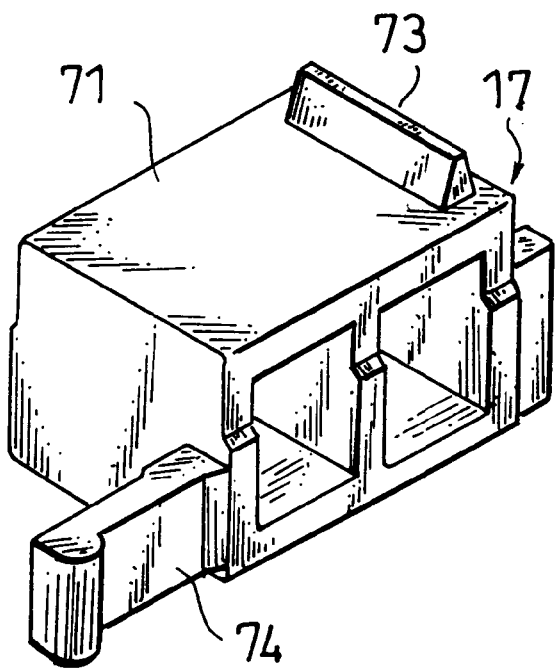

The erasure prevention member 17, as shown in FIGS. 4A and 4B, includes a bottom surface 71 acting as an operation surface and provided thereon with an operation section 73 and a top surface provided thereon with an identification section 72. Also, the erasure prevention member 17 is provided thereon with a hook-like projection 74, which is releasably engaged with a holding groove provided on a guide surface of the erasure prevention member 34. This ensures positive and smooth sliding of the erasure prevention member 17 while preventing detachment thereof from the casing, to thereby facilitate operation thereof and identification thereof. Also, the erasure prevention section 34 is constructed so as to permit the erasure prevention member 17 to be elastically held therein, as well as to be selectively moved to either a recordable position or an unrecordable position. In the illustrated embodiment, the identification section 72 and operation section 73 of the erasure prevention member 17 are arranged on the top and bottom surfaces thereof, respectively. Also, the erasure prevention member 17 is formed separately from the cover 30, however, it may be so constructed that operation of the cover 30 permits it to be moved together with the cover 30. Also, in order to prevent the identification section 72 and operation section 73 each of which is in the form of a projection from interfering with the casing, the upper casing member 1 and lower casing member 2 are formed with the cutouts 13 and 23, respectively. In correspondence to arrangement of the cutouts 13 and 23, the cover 30 is preferably provided with a projection for closing an opening of each of the cutouts 13 and 23 and forming a part of a wall of each of operation and identification holes of the erasure prevention section 34.

When it is desired to move the cover 30 in the direction toward the open position with respect to the upper casing member 1 and lower casing member 2, the elastic element 33 provided on each of the opposite side wall portions 35 of the cover 30 is inwardly forced to release engagement between the cover 30 and the casing. Then, the cover 30 is drawn out from the casing by drawing out drawer sections 40 arranged at corners of a rear portion of the cover 30 while holding them between the fingers. Thus, the disc 4 may be taken out from the casing by merely opening the cover 30, so that operation of replacing the disc may be highly facilitated.

The side wall portions 35 of the cover 30 are each provided at a distal end thereof with a guided portion 39 so as to extend therefrom, which is fitted in each of the guide grooves 24 of the upper and lower casing members 1 and 2, to thereby ensure stable and smooth sliding of the cover 30.

The cover 30 is set in the upper and lower casing members 1 and 2 so as to be moved by a distance equal to or somewhat larger than a radius of the disc 4. For example, the cover 30 is incorporated in the upper and lower casing members 1 and 2 so that it may be moved by a distance larger than a length (r+R+α) obtained by adding a radius (r) of a drive shaft insertion hole formed at the center of the disc 4, a radius (R) of the disc 4, and a distance α between a rear side surface of the cartridge and the outer periphery of the disc 4 together. Setting of such a distance permits the disc 4 to be taken out from the disc receiving section 37 while holding the center of the disc 4 between the fingers when the cover 30 is open.

Further, in order to prevent the cover 30 from being detached from the upper and lower casing members 1 and 2 when the cover 30 is drawn out from the casing, the upper casing member 1 is provided with projections 14 as shown in FIG. 6B, each of which is abutted against a distal end $39_1$ of a corresponding one of the guided portions 39 provided on the side wall portions 35 of the cover 30. Such construction is employed in view of the fact that when a length of the guide grooves 24 of the casing regulates a range of sliding of the cover 30, mere engagement between the guided portions 39 and the guide grooves 24 is insufficient to prevent the cover 30 from being detached or removed from the casing when the cover 30 is outwardly pulled with increased force for the purpose of taking out the disc from the casing. The disc takeout mechanism 27 provided on the cover 30 is effective to ensure that the disc 4 is positively and safely taken out from the casing.

Referring now to FIGS. 8 to 12B, another embodiment of a disc cartridge according to the present invention is illustrated, which is adapted to receive an optical disc therein. A disc cartridge of the illustrated embodiment is likewise constructed so that a casing is formed on a side surface portion thereof opposite to a side surface portion thereof on which a shutter 5 is fitted with a disc takeout opening 15, through which a cover 30 is slidably fitted in the casing in a manner to be drawable out therefrom while being away from the upper and lower casing members 1 and 2.

The cover 30 is slidably arranged between the upper casing member 1 and the lower casing member 2 and, as shown in FIGS. 9A to 9C, provided with a bendable section 29, resulting in the cover 30 being folded in two through the bendable section 29 at a predetermined angle in relation to a direction in which the cover 30 is drawn out from the casing. Such construction permits the cover 30 to be bent through or about the bendable section 29 in the course of drawing-out of the cover 30 from the casing, to thereby ensure smooth loading and unloading of a disc 4 with respect to the casing when the casing has a reduced thickness.

In the illustrated embodiment, the cover 30 includes a disc support section 36 and is integrally formed through the bendable section 29. The bendable section 29 may be constituted of hinges formed at both side wall portions 35. Alternatively, the bendable section 29 may be constituted by a pivotal section such as mating members, a pin and a hole, or a holder provided at each of the side wall portions 35 or a joint of a fit section provided at each of the side wall portions, so that the cover 30 may be constructed of two parts bendably joined to each other through the bendable section 29.

The cover 30, as shown in FIGS. 9A and 9C, includes an outer wall portion 31 acting as a drawer front, as well as constituting a part of a side wall of the cartridge which closes the takeout opening 15 when it is fully inserted or drawn into the casing. The cover 30 also includes a pair of disc positioning ribs 32 of an arcuate shape arranged inside the outer wall portion 31, as well as a pair of the above-described side wall portions 35 provided on opposite ends of the outer wall portion 31 in a manner to extend therefrom while being opposite to each other. Also, the cover 30 includes the above-described disc support section 36 arranged so as to support a lower surface of the disc 4 while being surrounded or defined by the outer wall portion 31 and side wall portions 35. In the illustrated embodiment, the outer wall portion 31, disc positioning ribs 32, side wall portions 35 and disc support section 36 thus arranged cooperate with each other to provide a disc receiving section 37. Further, the cover 30 is provided with an erasure prevention section 34 for fittedly holding an erasure prevention member 17 therein in a manner to be in proximity to the outer wall portion 31. The cover 30 is fitted in the casing while sliding the side wall portions 35 of the cover 30 along the side wall of the casing.

The disc support section 36 is constituted by a bottom wall of the cover 30. Thus, the bottom wall 36 of the cover 30 functions to support the lower surface of the disc 4 thereon during taking-out or unloading of the disc 4 from the casing and charging or loading thereof into the casing. Also, the side wall portions 35 are provided with disc holding portions $36_1$ associated with the lower surface of the disc 4 in a manner to be opposite to each other, respectively. Such construction effectively prevents the disc 4 from inadvertently dislocated from the cover 30. Also, in the illustrated embodiment, the cover 30 further includes receiving ribs 28 each arranged between the disc support section 36 and a corresponding one of the disc holding portions $36_1$ so as to extend along a corresponding one of the side wall portions 35, resulting in connecting the disc support section 36 and the disc holding portions $36_1$ to each other therethrough, leading to reinforcing of the bendable section 29.

Also, in order to ensure that the cover 30 is effectively prevented from being detached from the upper and lower casing members 1 and 2 when the cover 30 is drawn out from the casing, the upper casing member 1 is provided with projections 14 as shown in FIG. 12B, each of which is abutted against a distal end $39_1$ of a corresponding one of guided portions 39 provided on the side wall portions 35 of the cover 30. In this instance, a disc takeout mechanism 27 provided in the cover 30 effectively ensures that operation of taking out the disc 4 from the casing is positively attained.

As can be seen from the foregoing, the disc cartridge of the present invention is so constructed that the cover includes the disc receiving section and the cover is slidably arranged between the upper casing member and the lower casing member, to thereby be drawn out from the casing through the disc takeout opening for taking out the disc from the casing. Such construction of the present invention, even when the disc cartridge is of the type that the shutter of a substantially U-shape in section for selectively closing the openings of the casing such as drive shaft insertion holes and head insertion holes is arranged, permits the disc to be readily taken out from the casing by merely operating the cover. Also, such construction highly improves operability in replacement of the disc and ensures movement of the disc along with the cover upon movement of the cover, to thereby facilitate loading and unloading of the disc with respect to the casing while preventing detachment of the cover from the casing.

Also, in the disc cartridge of the present invention, the bendable section may be provided at the cover to bend the cover in relation to the direction in which the cover is drawn out from the casing. This highly facilitates takeout and replacement of the disc.

Further, the disc cartridge of the present invention may be constructed in the manner that the cover is provided thereon with the disc takeout mechanism for moving the disc upon movement of the cover toward the disc takeout opening, resulting in the disc being taken out from the cover by merely opening the cover without inclining the casing. This ensures smooth and safe takeout of the disc from the casing.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:
   a casing including an upper casing member and a lower casing member;
   a disc-shaped medium rotatable received in said casing;

said casing being formed with openings including drive shaft insertion holes and head insertion holes;

a shutter arranged on said casing so as to selectively close said openings;

an elastic member arranged on said casing so as to urge said shutter in a direction in which said shutter is closed;

said casing being formed with a disc takeout opening through which said disc-shaped medium is taken out from said casing; and a cover arranged in said casing so as to open and close said disc takeout opening;

said cover including an outer wall portion which constitutes a part of a side wall of the cartridge for closing said disc takeout opening, a pair of side wall portions extending from opposite ends of said outer wall portion, and a disc receiving section extending between the outer wall portion and side wall portions of said cover, said disc receiving section including a disc support section adjacent the outer wall portion of said cover for supporting a lower surface of said disc-shaped medium and opposing disc holding portions extending from the side wall portions of said cover for engaging said disc-shaped medium, wherein said disc holding portions are spaced from said disc support section and said disc support section terminates at a position between the outer wall portion of said cover and said disc holding portions; and said cover being slidably arranged between said upper casing member and said lower casing member, to thereby be drawn out through said disc takeout opening from said casing, resulting in said disc-shaped medium being taken out from said casing, wherein said cover is provided with a bendable section so that it may be bent about said bendable section in relation to a direction in which said cover is slidably drawn out.

2. A disc cartridge as defined in claim 1, wherein said bendable section of said cover comprises a hinge provided on each of both sides of said cover.

3. A disc cartridge as claimed in claim 1, wherein said casing includes opposite side walls which form a part of a side wall of the cartridge; and said cover is slidably fitted in said casing while permitting said side wall portions to be slidable along said opposite side walls of said casing.

4. A disc cartridge as defined in claim 3, wherein said cover includes a stopper mechanism constituted by elastic elements adapted to be engaged with said casing.

5. A disc cartridge as defined in claim 3, wherein said disc receiving section further comprises arcuate ribs provided in said casing and disc positioning ribs of an arcuate shape provided in said cover so as to face an outer periphery of said disc-shaped medium;

said arcuate ribs of said casing and said disc positioning ribs of said cover being arranged in a manner to be opposite to each other.

6. A disc cartridge as defined in claim 3, wherein said side wall portions of said cover are each provided thereon with said disc holding portion, respectively, said disc holding portions being opposite to each other;

said disc holding portions being positioned forwardly of a straight line defined so as to extend in parallel with said outer wall portion of said cover and through a center of said disc-shaped medium received in said disc receiving section and arranged so as to hold the lower surface of said disc-shaped medium.

7. A disc cartridge as defined in claim 6, wherein said cover further includes receiving ribs through which the disc support section is connected to said disc holding portions and which extend along said side wall portions, respectively.

8. A disc cartridge as defined in claim 1, wherein said cover includes a stopper mechanism constituted by elastic elements adapted to be engaged with said casing.

9. A disc cartridge as defined in claim 1, wherein said disc receiving section further comprises arcuate ribs provided in said casing and disc positioning ribs of an arcuate shape provided in said cover so as to face an outer periphery of said disc-shaped medium;

said arcuate ribs of said casing and said disc positioning ribs of said cover being arranged in a manner to be opposite to each other.

10. A disc cartridge as defined in claim 1, wherein said cover is provided with a disc takeout mechanism for moving said disc-shaped medium upon movement of said cover in the direction toward an open position.

11. A disc cartridge as defined in claim 10, wherein said disc takeout mechanism is arranged so as to be spaced in a direction toward said shutter from an outer periphery of said disc-shaped medium when said cover keeps said disc takeout opening closed and so as to be abutted against an outer periphery of said disc-shaped medium to move said disc-shaped medium toward said disc takeout opening during movement of said cover in a direction toward the open position.

12. A disc cartridge comprising:

a casing including an upper casing member and a lower casing member;

a disc-shaped medium rotatable received in said casing;

said casing being formed with openings including drive shaft insertion holes and head insertion holes;

a shutter arranged on said casing so as to selectively close said openings;

an elastic member arranged on said casing so as to urge said shutter in a direction in which said shutter is closed;

said casing being formed with a disc takeout opening through which said disc-shaped medium is taken out from said casing; and a cover arranged in said casing so as to open and close said disc takeout opening;

said cover including an outer wall portion which constitutes a part of a side wall of the cartridge for closing said disc takeout opening, a pair of side wall portions extending from opposite ends of said outer wall portion, and a disc receiving section extending between the outer wall portion and side wall portions of said cover, said disc receiving section including a disc support section adjacent the outer wall portion of said cover for supporting a lower surface of said disc-shaped medium and opposing disc holding portions extending from the side wall portions of said cover for engaging said disc-shaped medium wherein said disc holding portions are spaced from said disc support section and said disc support section terminates at a position between the outer wall portion of said cover and said disc holding portions; and said cover being slidably arranged between said upper casing member and said lower casing member, to thereby be drawn out through said disc takeout opening from said casing, resulting in said disc-shaped medium being taken out from said casing, wherein said cover is provided with a bendable section so that it may be bent about said bendable section in relation to a direction in which said cover is slidably drawn out, and wherein said cover is slidably drawn out from said casing in a direction opposite to said shutter by a distance equal to or more than a radius of said disc-shaped medium.

13. A disc cartridge as defined in claim 12, wherein said casing includes opposite side walls which form a part of a side wall of the cartridge;

said cover is slidably fitted in said casing while permitting said side wall portions to be slidable along said opposite side walls of said casing.

14. A disc cartridge as defined in claim 12, wherein said cover includes a stopper mechanism constituted by elastic elements adapted to be engaged with said casing.

15. A disc cartridge as claimed in claim 12, wherein said disc receiving section further comprises arcuate ribs provided in said casing and disc positioning ribs of an arcuate shape provided in said cover so as to face an outer periphery of said disc-shaped medium;

said arcuate ribs of said casing and said disc positioning ribs of said cover being arranged in a manner to be opposite to each other.

16. A disc cartridge, comprising:

a casing including an upper casing member and a lower casing member, wherein said casing includes opposite side walls which form a part of a side wall of the cartridge;

a disc-shaped medium rotatably received in said casing;

said casing being formed with openings including drive shaft insertion holes and head insertion holes;

a shutter arranged on said casing so as to selectively close said openings;

an elastic member arranged on said casing so as to urge said shutter in a direction in which said shutter is closed;

said casing being formed with a disc takeout opening through which said disc-shaped medium is taken out from said casing; and a cover arranged in said casing so as to open and close said disc takeout opening;

said cover including an outer wall portion which constitutes a part of a side wall of the cartridge for closing said disc takeout opening a pair of side wall portions extending from opposite ends of said outer wall portion, and a disc receiving section extending between the outer wall portion and side wall portions of said cover, said disc receiving section including a disc support section adjacent the outer wall portion of said cover for supporting a lower surface of said disc-shaped medium and opposing disc holding portions extending from the side wall portions of said cover for engaging said disc-shaped medium, wherein said disc holding portions are spaced from said disc support section and said disc support section terminates at a position between the outer wall portion of said cover and said disc holding portions; and said cover being slidably arranged between said upper casing member and said lower casing member, to thereby be drawn out through said disc takeout opening from said casing, resulting in said disc-shaped medium being taken out from said casing, wherein said disc holding portions are positioned forwardly of a straight line defined so as to extend in parallel with said outer wall portion of said cover and through a center of said disc-shaped medium received in said disc receiving section and arranged so as to hold the lower surface of said disc-shaped medium.

17. A disc cartridge as defined in claim 16, wherein said cover further includes receiving ribs through which the disc support section is connected to said disc holding portions and which extend along said side wall portions, respectively.

18. A disc cartridge comprising:

a casing including an upper casing member and a lower casing member, wherein said casing includes opposite side walls which form a part of a side wall of the cartridge;

a disc-shaped medium rotatable received in said casing;

said casing being formed with openings including drive shaft insertion holes and head insertion holes;

a shutter arranged on said casing so as to selectively close said openings;

an elastic member arranged on said casing so as to urge said shutter in a direction in which said shutter is closed;

said casing being formed with a disc takeout opening through which said disc-shaped medium is taken out from said casing; and a cover arranged in said casing so as to open and close said disc takeout opening;

said cover including an outer wall portion which constitutes a part of a side wall of the cartridge for closing said disc takeout opening a pair of side wall portions extending from opposite ends of said outer wall portion and a disc receiving section extending between the outer wall portion and side wall portions of said cover, said disc receiving section including a disc support section adjacent the outer wall portion of said cover for supporting a lower surface of said disc-shaped medium and opposing disc holding portions extending from the side wall portions of said cover for engaging said disc-shaped medium, wherein said disc holding portions are spaced from said disc support section and said disc support section terminates at a position between the outer wall portion of said cover and said disc holding portions; and said cover being slidably arranged between said upper casing member and said lower casing member, to thereby be drawn out thorough said disc takeout opening from said casing, resulting in said disc-shaped medium being taken out from said casing, wherein a disc takeout mechanism is arranged so as to be spaced in a direction toward said shutter from an outer periphery of said disc-shaped medium when said cover keeps said disc takeout opening closed and so as to be abutted against said outer periphery of said disc-shaped medium to moce said disc-shaped medium toward said disc takeout opening during movement of said cover in a direction toward the open position.

19. A disc cartridge as defined in claim 18, wherein said disc takeout mechanism is constituted by disc moving projections each provided on an inner surface of a corresponding one of said side wall portions of said cover in a manner to be inwardly projected therefrom and be abutted against said outer periphery of said disc-shaped medium received in said cover to move said disc-shaped medium upon movement of said cover.

20. A disc cartridge comprising:

a casing including an upper casing member and a lower casing member, wherein said casing includes opposite side walls which form a part of a side wall of the cartridge;

a disc-shaped medium rotatable received in said casing;

said casing being formed with openings including drive shaft insertion holes and head insertion holes;

a shutter arranged on said casing so as to selectively close said openings;

an elastic member arranged on said casing so as to urge said shutter in a direction in which said shutter is closed;

said casing being formed with a disc takeout opening through which said disc-shaped medium is taken out from said casing; and a cover arranged in said casing so as to open and close said disc takeout opening;

said cover including an outer wall portion which constitutes a part of the side wall of the cartridge for closing said disc takeout opening, a pair of side wall portions extending from opposite ends of said outer wall portion, and a disc receiving section extending between the outer wall portion and side wall portions of said cover, said disc receiving section including a disc support section adjacent the outer wall portion of said cover for supporting a lower surface of said disc-shaped medium and opposing disc holding portions extending from the side wall portions of said cover for engaging said disc-shaped medium, wherein said disc holding portions are spaced from said disc support section and said disc Support section terminates at a position between the outer wall portion of said cover and said disc holding portions; and said cover being slidably arranged between said upper casing member and said lower casing member, to thereby be drawn out through said disc takeout opening from said casing, resulting in said disc-shaped medium being, taken out from said casing, wherein a disc takeout mechanism includes disc moving projections each provided on an inner surface of a corresponding one of said side wall portions of said cover in a manner to be inwardly projected therefrom and be abutted against a outer periphery of said disc-shaped medium received in said cover to move said disc-shaped medium upon movement of said cover.

* * * * *

UNITED STATES PATENT AND TRADEMARK OFFICE
CERTIFICATE OF CORRECTION

PATENT NO. : 6,205,115 B1
DATED : March 20, 2001
INVENTOR(S) : Ikebe et al.

It is certified that error appears in the above-identified patent and that said Letters Patent is hereby corrected as shown below:

Column 3,
Line 16, "advertently" should read -- inadvertently --.

Column 10,
Line 7, "dislocated" should read -- dislocating --.

Column 11,
Cancel lines 58-61.
Line 62, "being" should read -- are --.

Column 12,
Line 58, after "medium" insert -- , --.

Column 13,
Line 46, after "opening" insert -- , --.

Column 14,
Line 28, after "opening" insert -- , --.
Line 29, after "portion" insert -- , --.
Line 52, "moce" should read -- move --.

Column 15,
Line 1, "rotatable" should read -- rotatably --.
Line 16, "the" should read -- a --.

UNITED STATES PATENT AND TRADEMARK OFFICE
CERTIFICATE OF CORRECTION

PATENT NO. : 6,205,115 B1
DATED : March 20, 2001
INVENTOR(S) : Ikebe et al.

It is certified that error appears in the above-identified patent and that said Letters Patent is hereby corrected as shown below:

<u>Column 16,</u>
Line 6, "Support" should read -- support --.
Line 18, "a" should read -- an --.

Signed and Sealed this

Sixteenth Day of October, 2001

Attest:

NICHOLAS P. GODICI
*Attesting Officer*      *Acting Director of the United States Patent and Trademark Office*